United States Patent
Behrens et al.

(10) Patent No.: US 8,910,116 B2
(45) Date of Patent: Dec. 9, 2014

(54) SYSTEM AND METHOD FOR PROVIDING TOOLS WITHIN A HUMAN CAPITAL MANAGEMENT SYSTEM

(75) Inventors: Christian Behrens, Wiesloch (DE); Steffen Rotsch, Rauenberg (DE); Martin Scholz, Nußloch (DE)

(73) Assignee: SAP SE, Walldorf (DE)

( * ) Notice: Subject to any disclaimer, the term of this patent is extended or adjusted under 35 U.S.C. 154(b) by 975 days.

(21) Appl. No.: 11/829,143

(22) Filed: Jul. 27, 2007

(65) Prior Publication Data
US 2009/0030934 A1    Jan. 29, 2009

(51) Int. Cl.
*G06F 9/44* (2006.01)
*G06Q 10/06* (2012.01)

(52) U.S. Cl.
CPC .................................. *G06Q 10/06* (2013.01)
USPC ........................... 717/113; 717/108; 717/103

(58) Field of Classification Search
CPC ........... G06F 8/20; G06F 8/38; G06F 3/0481; G06Q 10/0633; G06Q 10/0639
USPC .......................................... 717/113, 108, 103
See application file for complete search history.

(56) References Cited

U.S. PATENT DOCUMENTS

| | | | | |
|---|---|---|---|---|
| 5,682,526 A * | 10/1997 | Smokoff et al. | ...................... | 1/1 |
| 6,230,318 B1 * | 5/2001 | Halstead et al. | ............... | 717/108 |
| 7,730,493 B2 * | 6/2010 | Elms et al. | .................... | 719/316 |
| 2005/0108272 A1 * | 5/2005 | Behrens et al. | ............... | 707/102 |
| 2007/0150864 A1 * | 6/2007 | Goh | ............................... | 717/113 |
| 2008/0091774 A1 * | 4/2008 | Taylor et al. | .................. | 709/203 |

* cited by examiner

*Primary Examiner* — Li B Zhen
*Assistant Examiner* — Duy Khuong Nguyen
(74) *Attorney, Agent, or Firm* — Kenyon & Kenyon LLP

(57) ABSTRACT

A system and method are provided for instantiating tools within a computer application. The method includes defining a base class, base methods and base properties, wherein the base methods and base properties are associated with the base class. The method includes defining a tool class inheriting from the base class, wherein the tool class will include the base methods and properties. The method includes instantiating a first tool from the tool class within the computer application, wherein the computer application automates human resource management processes. The method includes providing the first tool within the computer application, wherein the first tool provides a user interface to a functionality of the computer application.

14 Claims, 3 Drawing Sheets

SYSTEM AND METHOD FOR PROVIDING TOOLS WITHIN A HUMAN CAPITAL MANAGEMENT SYSTEM

BACKGROUND

A human capital management (HCM) system may automate various human resource processes. For example, a HCM system may automate the functionality of hiring a new employee, terminating an existing employee, reassigning an employee, granting extended leave, etc. Each functionality may require one or more approvals before the request is granted, and the HCM system automates the process of generating the appropriate requests and collecting completed approvals before granting the request if the process was successfully completed. In addition, a HCM system may provide various workforce analytics, which quantifies various aspects of human resources management within the HCM system.

To setup such a process, various customizing tables are required to be maintained by customers.

Within the HCM system, various tools are implemented to provide functionality for maintaining these customizing tables. Previously, tools would be individually programmed, leading to problems maintaining consistent interfaces and behaviours among different tools.

Object-oriented programming (OOP) is a programming paradigm that uses "objects" to design applications and programs. OOP emphasizes modularity in software by treating the application or program as a collection of cooperating objects, as opposed to a traditional view in which a program is a list of instructions to the computer. Each object is capable of receiving messages, processing data, and sending messages to other objects. Thus, each object can be viewed as an independent machine with a distinct role or responsibility. The emphasis on modularity promotes greater flexibility and maintainability compared to previous approaches.

Thus, a need exists to provide consistent interface and behavior in a plurality of tools in a HCM system.

DETAILED DESCRIPTION

A method and system to utilize an objected-oriented approach in designing and creating tools within an system. By implementing tools as objects that inherit from an abstract base class which can inherit again from a second base class, common behaviour and interface may be provided even in a system with a large number of tools. Tool-specific functionality may be provided in special tool methods associated with the tool, while generic or common functionality are provided in base or abstract methods.

Figure 1:
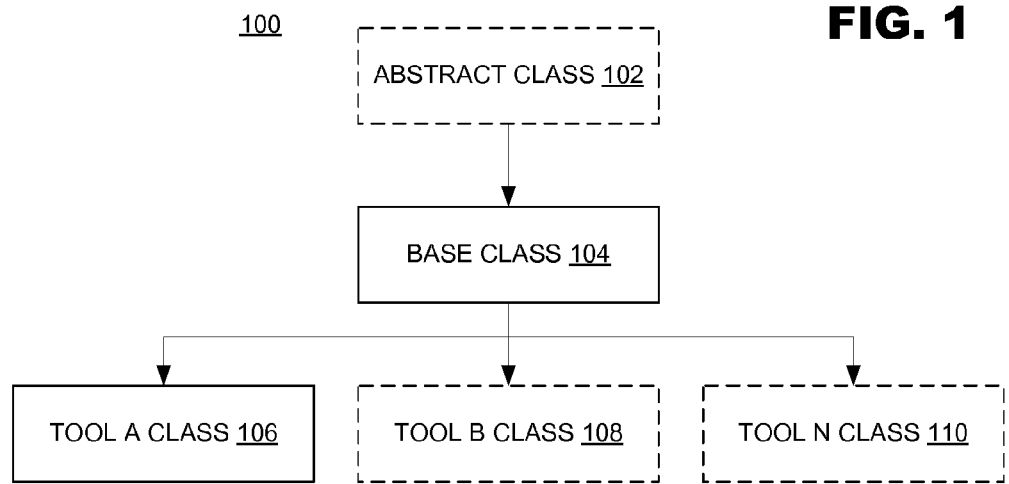
FIG. 1 depicts an example class diagram in accordance with an embodiment of the present invention.

FIG. 1 depicts an example class diagram in accordance with an embodiment of the present invention. The class diagram 100 depicts relationships between a plurality of classes within an object-oriented computer application, such as an HCM system. An abstract class 102 may optionally be defined, and may include abstract methods and properties. Abstract methods and properties may be unusable until further defined in children classes.

A base class 104 may inherit from the abstract base class 102, and include all abstract methods and properties associated with the abstract class 102. In an alternative embodiment, the abstract base class 102 may also be a base class 104 from which to inherit child classes.

The base class 104 may also include additional base methods and properties. The base class 104 may further define abstract methods and properties. Base methods and properties may be defined as "final", that is, unable to be changed in children classes. A "final" method may be useful to guarantee an exact implementation of the method. A "final" property may be useful to guarantee how a value is stored in the base class 104.

A plurality of tool classes 106, 108 and 110 may inherit from the base class 104. A tool class may inherit all base methods and properties, as well as define its own tool methods and properties. Each tool class may define a class from which a tool may be instantiated within the system. Each tool will be as discussed later.

It will be appreciated that any number of tool classes may be defined in the system, each inheriting from the base class 104. It will be appreciated that the system may include one abstract base class and one or more base classes, and a tool class may inherit from any parent class.

In a HCM system, there may be two base classes defined: top level objects: process and form scenarios. A process may include a plurality of properties, such as a description of the process and whether the process may be executed in parallel with other processes. The process may include a validity period, during when the process is valid. As processes may change over time, a validity period is necessary to ensure an appropriate process is executed. The process may include a workflow which defines the process flow. The workflow template may be associated with the validity period and can therefore change over time. The process may include one or more form scenarios, which provide a user interface for a user executing the process to enter data in a form. Processes and form scenarios are defined with the tools in the design time.

From the description above, it is clear that a tool includes a tool class from which it is instantiated, a function module to display a user interface, and a screen of the user interface and the screen's status. All tool classes inherit from a base class. Tools may be for maintaining object properties (full screen tool) or object existence (create, copy, or delete an object) (popup tool).

Figure 2:
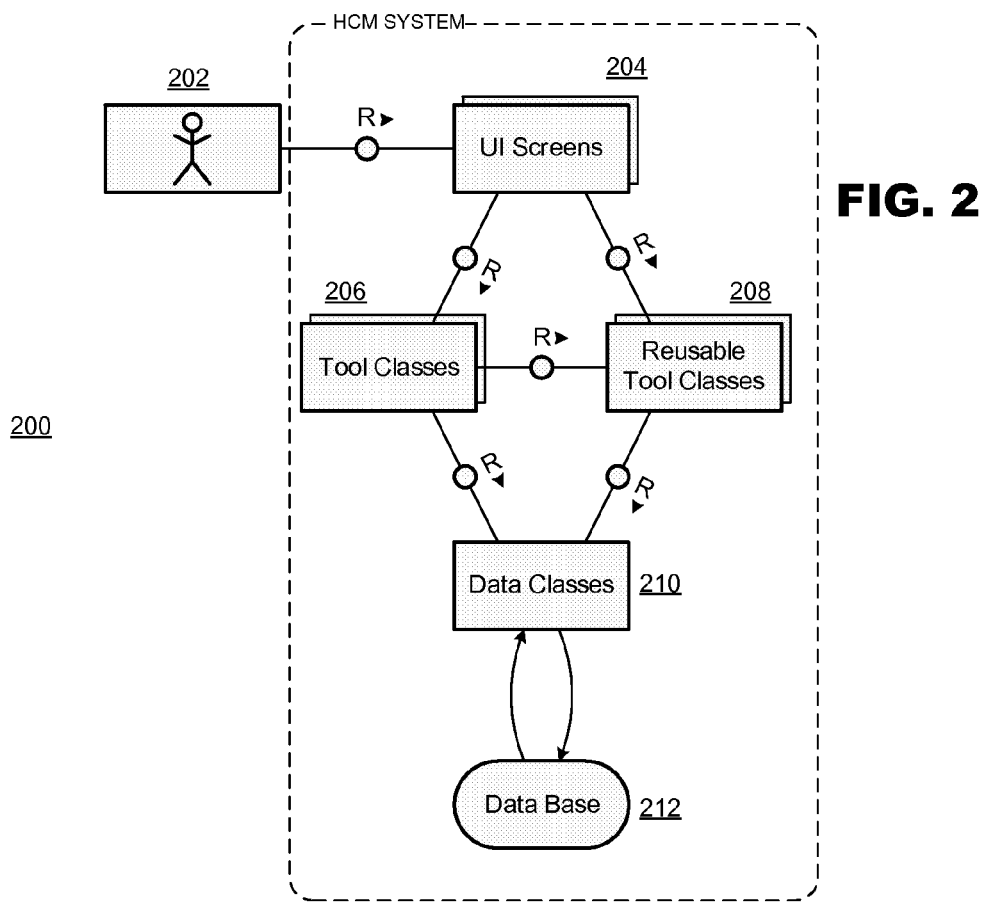
FIG. 2 depicts an example interaction diagram in accordance with an embodiment of the present invention.

FIG. 2 depicts an example interaction diagram in accordance with an embodiment of the present invention. An interaction diagram 200 may depict relationships between various components within a HCM system. The HCM system may include components as discussed below.

A user 202 may interact with user screens 204. For example, the HCM system may execute on a server, and the user 202 may be in communication with the HCM system through a terminal over a network, as discussed later.

A user screen 204 may be defined by tool classes 206 and reusable tool classes 208. Tool classes may be reusable, and each tool may be associated with a user screen 204 for displaying information and receiving data input.

Tool classes 204 and reusable tool classes 208 may interact with data classes 210. New tool classes may be defined within the system with tool-specific methods and properties to implement special tool-specific functionality but inheriting from one base class. In addition, each tool class includes functionality already included through inheritance from the tool's parent classes, such as a base class or abstract class. A tool class may inherit from another tool class, and such parent tool classes may be reusable.

Data classes 210 may interact with a database 212. Data within the HCM system may be stored in a database, and may be accessed by tools through a data class. This provides a further layer of abstraction between database operation and tool class design. In one embodiment, all data handling functionality such as read data, save data, commit data, and rollback data are handled by the data classes 210.

In one embodiment, user screens 204 may be programmed without any knowledge of any tool classes 206 or reusable tool classes 208. In this embodiment, the user screen 204 may invoke methods defined by an abstract or base class, thereby guaranteeing a uniform behavior of all tools within the system. Such methods may be defined as "final" and cannot be changed in children classes, as discussed above. Abstract classes may define simply the interface of a method, which then must be further defined in children classes such as a base class or a tool class, as discussed above.

Figure 3:
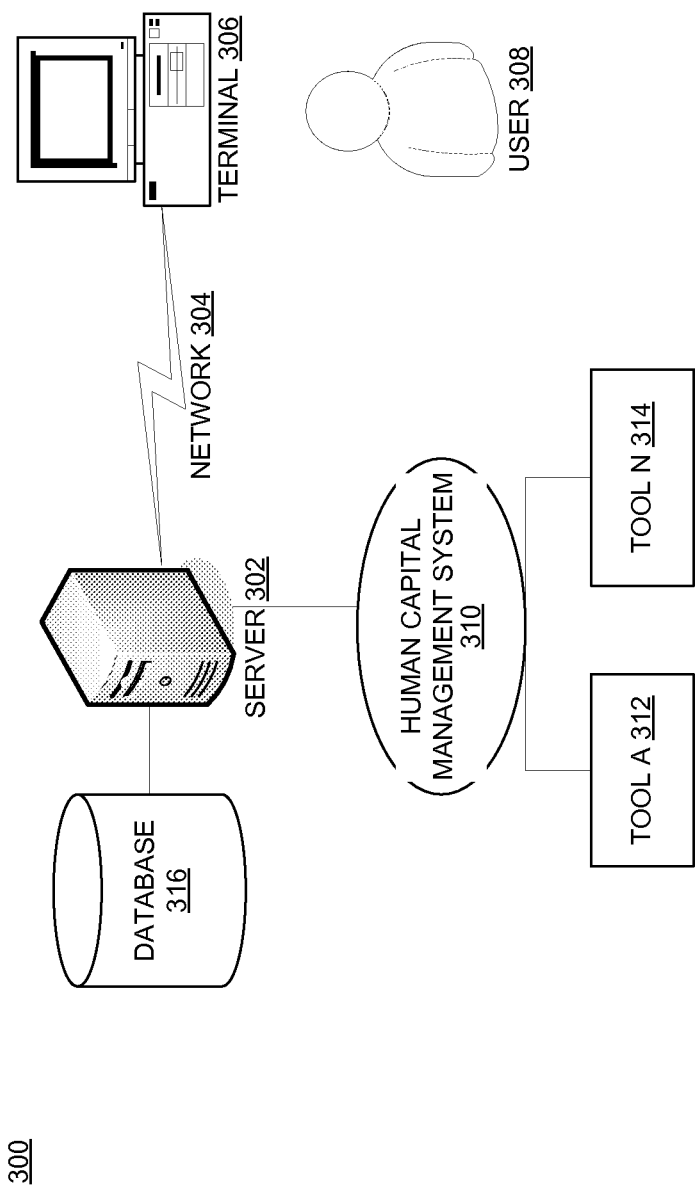
FIG. 3 depicts an example system for executing a human capital management system in accordance with an embodiment of the present invention.

FIG. 3 depicts an example system for executing a human capital management system in accordance with an embodiment of the present invention. A system 300 may be configured to execute a computer application such as HCM system, for example, in an enterprise environment. The HCM system may automate human resources functions within the enterprise.

The system 300 may include a server 302. The server 302 may include a processor configured to execute computer instructions stored in a memory, for example, the HCM system. The server 302 may include a variety of security and backup measures to ensure continual operation and data security. While only one server is depicted, it will be appreciated that a distributed system of servers may be used.

The server 302 may be in communication with a terminal 306 over a network 304. The network 304 may be configured to communicate information between the server 302 and the terminal 306, and be the Internet, a local network, a Wide Area Network, a wireless network or other network or communication scheme.

The terminal 306 may interact with a user 308. For example, the terminal 306 may be a personal computer, a mobile device, a wireless device, or any other device configured to interact with the user 308 and communicate with the server 302 over the network 304.

The user 308 may be an authorized user of the system with permission to utilize the HCM system. For example, the user 308 may be a human resources administrator within an enterprise authorized to use the HCM system.

The server 302 may execute a HCM system 310. The HCM system 310 may be a computer application and include classes and objects as discussed above.

The HCM system 310 may include instantiated tools 312 and 314. The tools 312 and 314 may be instantiated from tool classes as discussed above.

The server 302 may be in communication with a database 316. The database 316 may be a medium configured to store data related to the HCM system 310. For example, the database 316 may be a hard drive, a RAID array, or any other rewritable medium. The database 316 may be accessible to the HCM system 310. The database 316 may be physically located in a geographically separate location from the server 202 for data security or other purposes. Data stored within the database 316 may be accessed by the HCM system 310 via data classes, as discussed above.

Figure 4:
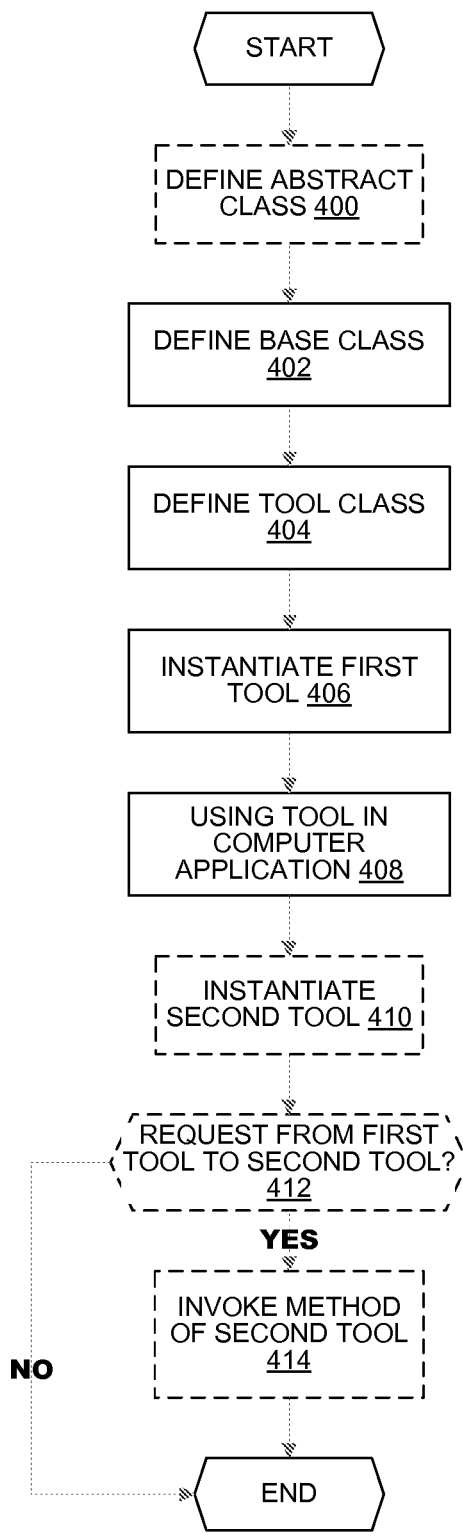
FIG. 4 depicts an example procedure for instantiating a tool in a human capital management system in accordance with an embodiment of the present invention.

FIG. 4 depicts an example procedure for instantiating a tool in a human capital management system in accordance with an embodiment of the present invention. The procedure may execute on a system including a server and a terminal as discussed above. The procedure may be executed by a programmer defining tool classes for use in the system, from which tools are instantiated, as discussed above. A user may then use a tool instantiated from a tool class for use in the system.

In 400, the programmer may optionally define abstract classes. For example, an abstract class may include abstract methods and properties which are to be later defined in children classes, as discussed above.

In 402, the programmer may define base class. For example, a base class may include base methods and properties, which may be "final" and thus not changeable in children classes, as discussed above. Base methods and properties may define certain common behavior among various tool classes that inherit from the base class.

In 404, the programmer may define a tool class. For example, the tool class may inherit from the base class defined in 402. The tool class may be as discussed above.

In 406, the system may instantiate a tool from the tool class defined in 404. It will be understood that a plurality of tools may be instantiated from a tool class within the HCM system as necessary.

In 408, a user may use the tool instantiated in 406. The tool may provide a user screen within the HCM system to a user as discussed above.

In 410, a user may optionally instantiate a second tool. The second tool may be instantiated from the tool class of 404 or a second tool class. The second tool may cooperate with the first tool to provide functionality within the HCM system.

In 412, the system may test whether a request from the first tool to the second tool has been received. If yes, the procedure proceeds to 414. If no, the procedure may end.

In 414, the system may optionally invoke a requested method of the second tool. The invoked method may be determined from the request received in 412.

An example embodiment of the present invention may be a method for instantiating tools within a computer application. The method may include defining a base class, base methods and base properties, wherein the base methods and base properties are associated with the base class. The method may include defining a tool class inheriting from the base class, wherein the tool class will include the base methods and properties. The method may include instantiating a first tool from the tool class within the computer application, wherein the computer application automates human resource management processes. The method may include providing the first tool within the computer application, wherein the first tool provides a user interface to a functionality of the computer application. The computer application may execute on a server and communicate with at least one terminal over a network. The application may be a human capital management application and the first tool provides a form within the human resource management computer application. The method may include defining an abstract class, wherein the base class inherits from abstract class and the abstract class is associated with abstract methods that are common to all tools. E each tool may be associated with a tool class, a user interface display, and runtime logic providing the functionality of the computer application. The first tool may maintain one of object properties or object existence within the computer application. The method may include instantiating a second tool within the computer application, wherein the first tool invokes a method associated with the second tool.

Another example embodiment of the present invention may be a system for instantiating tools within a computer application. The system may include a memory. The system may include a processor in communication with the memory. The processor may be configured to, responsive to programmer input, define a base class, base methods and base properties, wherein the base methods and base properties are associated with the base class. The processor may be configured to, responsive to programmer input, define a tool class inheriting from the base class, wherein the tool class will include the base methods and properties. The processor may be configured to, responsive to programmer input, instantiate a first tool from the tool class within the computer application, wherein the computer application automates human resource management processes. The processor may be configured to, responsive to programmer input, provide the first tool within the computer application, wherein the first tool provides a user interface to a functionality of the computer application. The processor may be part of a server and communicates with at least one terminal over a network. The application may be a human capital management application and the first tool provides a form within the human resource management computer application. The processor may be configured to, responsive to programmer input, define an abstract class, wherein the base class inherits from abstract class and the abstract class is associated with abstract methods that are common to all tools. Each tool may be associated with a tool class, a user interface display, and runtime logic providing the functionality of the computer application. The first tool may maintain one of object properties or object existence within the computer application. The processor may be configured to, responsive to programmer input, instantiate a second tool within the computer application, wherein the first tool invokes a method associated with the second tool.

Another example embodiment of the present invention may be a computer-readable medium including instructions adapted to execute a method for instantiating tools within a computer application. The method may include defining a base class, base methods and base properties, wherein the base methods and base properties are associated with the base class. The method may include defining a tool class inheriting from the base class, wherein the tool class will include the base methods and properties. The method may include instantiating a first tool from the tool class within the computer application, wherein the computer application automates human resource management processes. The method may include providing the first tool within the computer application, wherein the first tool provides a user interface to a functionality of the computer application. The computer application may execute on a server and communicates with at least one terminal over a network. The application may be a human capital management application and the first tool provides a form within the human resource management computer application. The method may include defining an abstract class, wherein the base class inherits from abstract class and the abstract class is associated with abstract methods that are common to all tools. Each tool may be associated with a tool class, a user interface display, and runtime logic providing the functionality of the computer application. The method may include instantiating a second tool within the computer application, wherein the first tool invokes a method associated with the second tool, wherein the first tool and the second tool each maintains one of object properties or object existence within the computer application.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

What is claimed is:

1. A method for instantiating tools within a computer application, comprising:
   defining a base class, base methods and base properties, wherein the base methods and base properties are associated with the base class;
   defining a tool class inheriting from the base class, wherein the tool class will include the base methods and properties;
   instantiating a first tool from the tool class within the computer application, wherein the computer application automates human resource management processes;
   providing the first tool within the computer application; and
   instantiating a second tool from the tool class within the computer application, wherein the first tool invokes a method associated with the second tool;
   wherein each tool instantiated from the tool class is associated with a common user interface display for the automated human resource management processes, and provides runtime logic associated with functionality of the automated human resource management processes, each of the automated human resource management processes including a process workflow, at least one workflow having a validity period indicating whether a process is executable, and further including a data field indicating whether each respective process is executed in parallel with other processes.

2. The method of claim 1, wherein the computer application executes on a server and communicates with at least one terminal over a network.

3. The method of claim 2, wherein the application is a human capital management application and the first tool provides a form within the human resource management computer application.

4. The method of claim 1, further comprising:
   defining an abstract base class, wherein the base class inherits from abstract base class and the abstract base class is associated with abstract methods that are common to all tools.

5. The method of claim 1, wherein the first tool maintains one of object properties or object existence within the computer application.

6. A system for instantiating tools within a computer application, comprising:
   a memory, and
   a processor in communication with the memory, the processor configured to, responsive to programmer input,
      define a base class, base methods and base properties, wherein the base methods and base properties are associated with the base class,
      define a tool class inheriting from the base class, wherein the tool class will include the base methods and properties,
      instantiate a first tool from the tool class within the computer application, wherein the computer application automates human resource management processes,
      provide the first tool within the computer application, instantiate a second tool from the tool class within the computer application, wherein the first tool invokes a method associated with the second tool; and wherein each tool instantiated from the tool class is associated with a common user interface display for the automated human resource management process, and provides runtime logic associated with functionality of the automated human resource management processes, each of the automated human resource management processes including a process workflow, at least one workflow having a validity period indicating whether a process is executable, and further including a data field indicating whether each respective process is executed in parallel with other processes.

7. The system of claim 6, wherein the processor is part of a server and communicates with at least one terminal over a network.

8. The system of claim 7, wherein the application is a human capital management application and the first tool provides a form within the human resource management computer application.

9. The system of claim 6, the processor further configured to, responsive to programmer input,
define an abstract class, wherein the base class inherits from abstract class and the abstract class is associated with abstract methods that are common to all tools.

10. The system of claim 6, wherein the first tool maintains one of object properties or object existence within the computer application.

11. A non-transitory computer-readable medium including instructions adapted to execute a method for instantiating tools within a computer application, the method including,
defining a base class, base methods and base properties, wherein the base methods and base properties are associated with the base class;
defining a tool class inheriting from the base class, wherein the tool class will include the base methods and properties;
instantiating a first tool from the tool class within the computer application, wherein the computer application automates human resource management processes;
providing the first tool within the computer application; and
instantiating a second tool from the tool class within the computer application, wherein the first tool invokes a method associated with the second tool, wherein the first tool and the second tool each maintains one of object properties or object existence within the computer application;
wherein each tool instantiated from the tool class is associated with a common user interface display for the automated human resource management processes, and provides runtime logic associated with functionality of the automated human resource management processes, each of the automated human resource management processes including a process workflow, at least one workflow having a validity period indicating whether a process is executable, and further including a data field indicating whether each respective process is executed in parallel with other processes.

12. The non-transitory computer medium of claim 11, wherein the computer application executes on a server and communicates with at least one terminal over a network.

13. The non-transitory computer medium of claim 12, wherein the application is a human capital management application and the first tool provides a form within the human resource management computer application.

14. The non-transitory computer medium of claim 11, the method further comprising:
defining an abstract class, wherein the base class inherits from abstract class and the abstract class is associated with abstract methods that are common to all tools.

* * * * *